(No Model.) 2 Sheets—Sheet 2.
L. P. & W. A. HELPHINSTINE.
STEERING DEVICE FOR TRACTION ENGINES.
No. 364,411. Patented June 7, 1887.
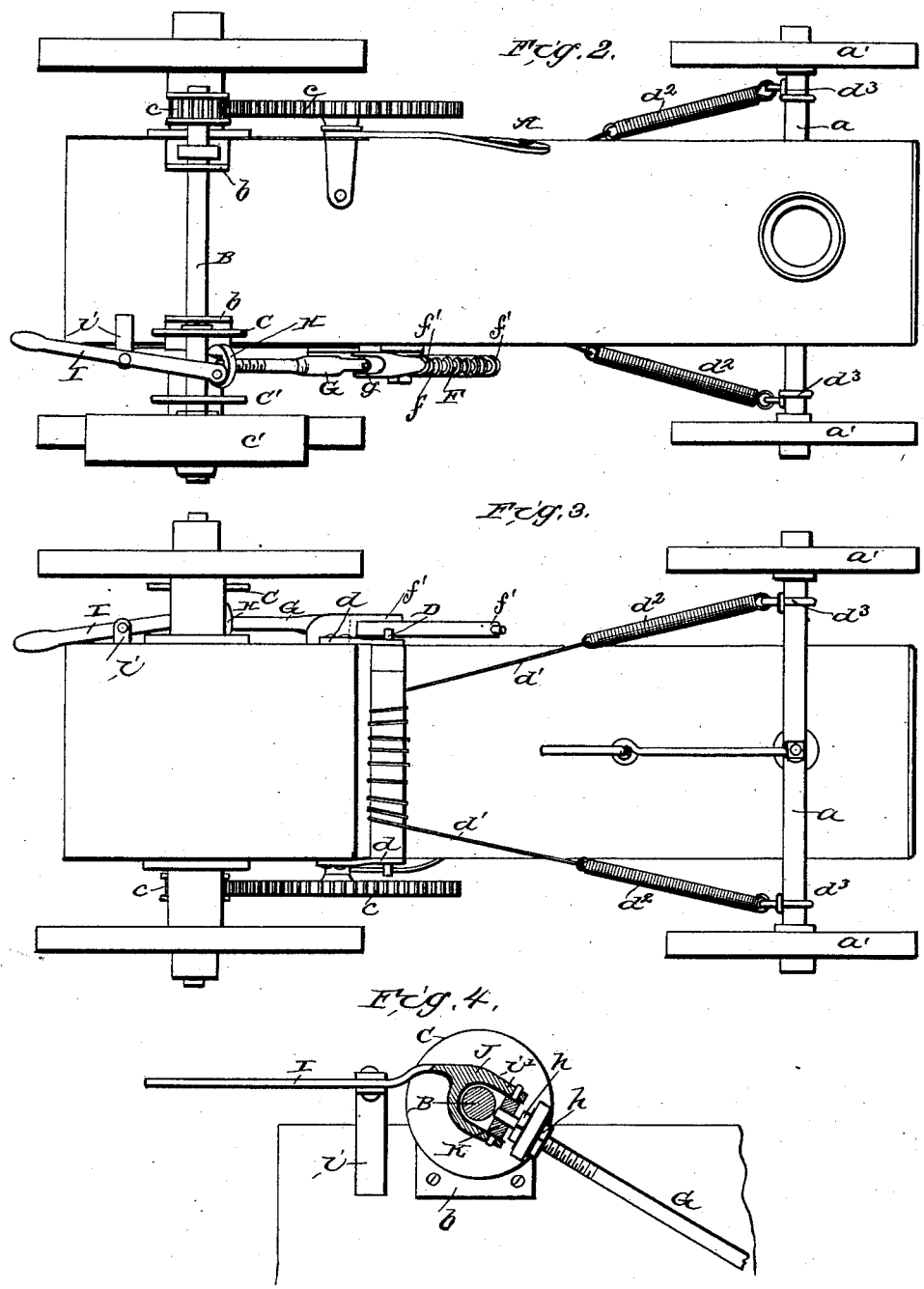

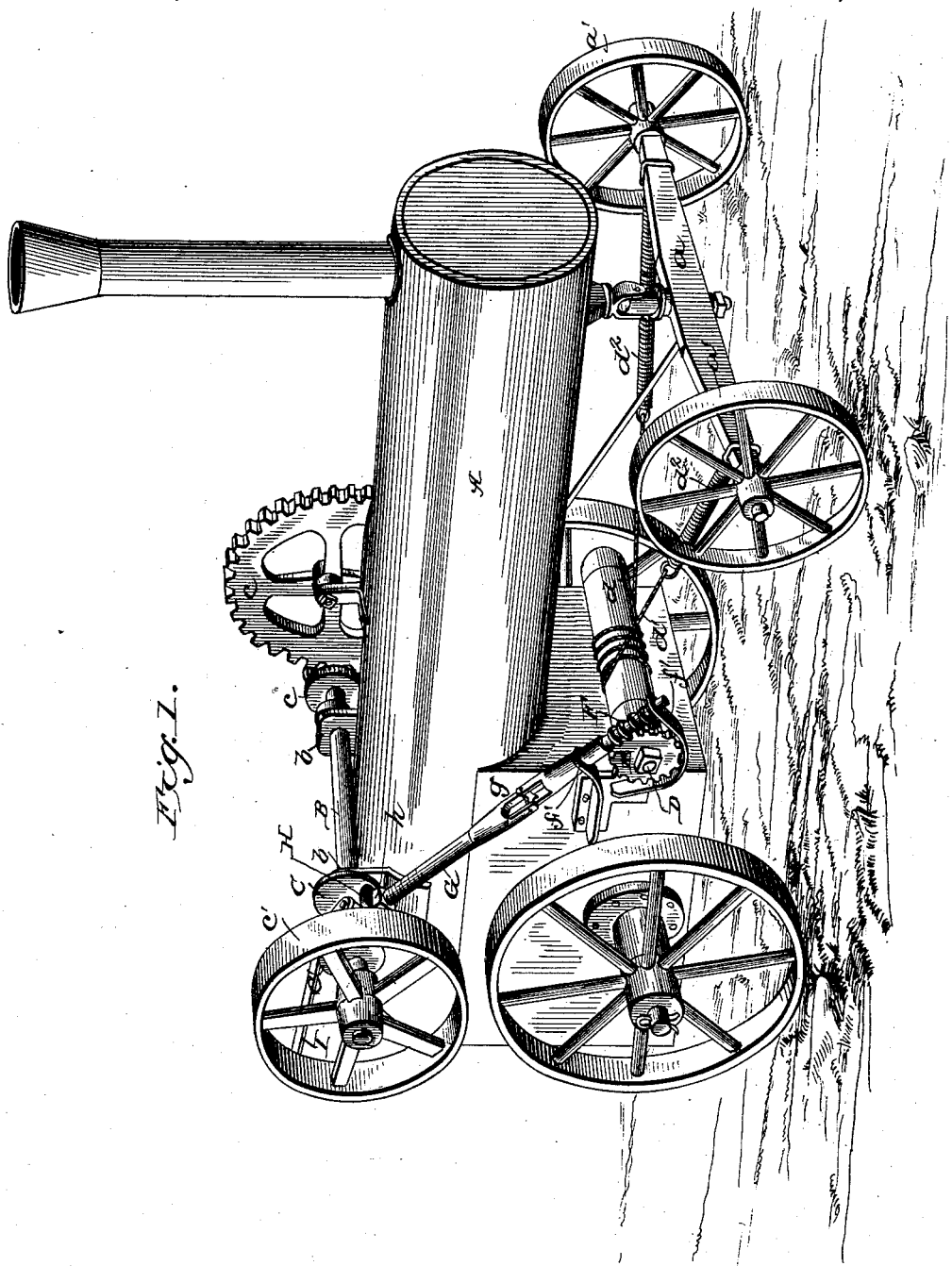

UNITED STATES PATENT OFFICE.

LON PECK HELPHINSTINE AND WILLIAM AIKMAN HELPHINSTINE, OF WASHINGTON, INDIANA.

STEERING DEVICE FOR TRACTION-ENGINES.

SPECIFICATION forming part of Letters Patent No. 364,411, dated June 7, 1887.

Application filed April 5, 1887. Serial No. 233,773. (No model.)

*To all whom it may concern:*

Be it known that we, LON PECK HELPHINSTINE and WILLIAM AIKMAN HELPHINSTINE, citizens of the United States, residing at Washington, in the county of Daviess and State of Indiana, have invented new and useful Improvements in Automatic Steering Devices, of which the following is a specification.

The invention relates to improvements in automatic steering devices, and is mainly applicable to road or traction engines, the object being to cause the engine to furnish the power to steer itself; and it consists in the construction and arrangement of two fixed friction-disks and one sliding friction-wheel, and the combination of the same with certain other parts, as hereinafter described, illustrated in the drawings, and pointed out in the appended claims.

In the accompanying drawings, Figure 1 is a perspective view of a part of an engine embodying the invention. Fig. 2 is a plan view of the same. Fig. 3 is a reversed plan thereof, showing the attachments of the device to the front axle of the engine. Fig. 4 is a detail sectional view through the shaft carrying the friction-disk.

Referring to the drawings, A designates an engine provided with the front axle, $a$, and front wheels, $a'$ $a'$.

B is a transverse shaft journaled in suitable supports, $b$ $b$, secured to the engine over the rear wheels, and having secured to it at one side, outside of its journal, the two similar friction-disks, C C', situated a proper distance apart. The said shaft is rotated by gearing $c$ $c$, connecting it with the main driving-shaft of the engine, and carries on it a fly-wheel, $c'$, to regulate its motion.

D is a transverse shaft or drum journaled in proper bearings, $d$ $d$, on the lower part of the engine, in rear of the front axle, and connected therewith by chains $d'$ $d'$ and coiled springs $d^2$ $d^2$. The said springs have their front ends connected to clips $d^3$ $d^3$, secured to the axle at equal distances from the ends thereof, and their rear ends connected to the adjacent ends of the chains $d'$, which are secured at their rear ends to the central part of the shaft or drum D and wind thereon in opposite directions.

Wire ropes may be substituted for the chains, if desired.

E is a worm-wheel on the journal of the shaft D, extended outside its bearing on the same side of the machine as the friction-disks, and F is a worm meshing therewith and secured on the lower part, $f$, of an inclined shaft, G, that turns in bearings in the brackets $f'$ $f'$, secured to the side of the engine.

$g$ is a universal joint on the shaft G, which has secured upon its threaded upper end the friction-wheel H, between the friction-disks C C', but normally bearing on neither.

$h$ $h$ are nuts on said threaded end of the shaft, on each side of the friction-wheel, for the purpose of setting the latter in and out on the same and causing it to bear nearer to or farther from the center of the friction-disks.

I is a lever pivoted on a standard, $i$, rising from the engine in rear of the shaft B, and J is a sliding journal-box on said shaft between the friction-disks, having trunnioned or socketed bearings in the arms of the bifurcated end $i'$ of the said lever.

K is a bar journaled at its ends in the ends of the arms of said bifurcation, and having a bearing centrally for the upper end of the shaft G.

From the above description it is evident that by turning the lever I so as to cause the friction-wheel to bear on the rotating friction-disk C the shafts G will be rotated, the worm F will rotate the wheel E and shaft or drum D, and one of the chains or wire ropes will be wound on the said shaft and the other unwound therefrom, turning the front axle in one direction. To turn it in the opposite direction, the friction-wheel is caused to bear on the disk C'. The rapidity with which the axle is turned may be regulated by changing the position of the friction-wheel on the shaft G by means of the nuts $h$ $h$.

The device is simple and effective, and can be readily and instantly operated by the engine-driver, as the lever I is within easy reach of his hand.

Having thus described our invention, we claim—

1. The combination, with the front axle, the shaft provided with a worm-wheel on one end, and the cords or chains connecting the said shaft and axle and winding in opposite directions on the shaft, of two friction-disks secured on a shaft rotated by the engine, a shaft having a worm on its lower end to engage said worm-wheel, and a universal joint at a proper point, the friction-wheel on the upper end of said shaft between the two friction-disks, and the lever I, to move the said friction-wheel laterally, substantially as specified.

2. In a traction-engine, the combination, with the shaft B, rotated by the engine, the friction-disks C C' on the said shaft, the front axle, drum in rear of the said axle, worm-wheel on the end of the drum, springs connected to the axle, and chains attached to the springs and adapted to be wound on the drum, of the shaft G, having the universal joint, worm on the lower end of the said shaft, friction-wheel on the upper end of the shaft G, and the lever I, loosely journaled at one end on the shaft B, between the disks C C', and connected to the friction-wheel, substantially as and for the purpose set forth.

3. The combination, with the front axle, of the springs connected thereto, chains or cords secured to the ends of the said springs, rotating drum to wind the said chains thereon in opposite directions, and means whereby the said drum may be rotated in opposite directions at will, substantially as and for the purpose set forth.

4. In a traction-engine, the combination, with the front axle, cords attached thereto, drum to oppositely wind the said cords, and the worm-wheel on the said drum, of the shaft or rod rotated by the engine, friction-disks thereon, the shaft having the worm to engage with the wheel on the drum, and friction-roller on the end of said shaft to be rotated by either disk at the will of the operator, the said friction-roller being adapted to be longitudinally adjusted on the said shaft to alter the speed of the rotation thereof, as desired, substantially as and for the purpose set forth.

5. In a traction-engine, the front axle, the cords attached thereto, the drum to oppositely wind the said cords, and the worm-wheel on the said drum, combined with the shaft rotated by the engine, the friction-disks thereon, the lever pivoted a short distance from the said shaft and having a bifurcated end, the arms of which pass on opposite sides of the said shaft and forming a bearing to operate on the said shaft between the disks, a jointed rod or shaft having a worm to engage with the said worm-wheel on the drum and the threaded upper end, the trunnion on the upper end of the said rod, the bar K, journaled at the central point on the said trunnion, the opposite ends of the said bar bearing in journals in the arms of the said bifurcated end of the lever, the friction-roller on the said threaded end of the rod and adapted to be caused to impinge against either disk by operating the said lever, and the nuts on opposite sides of the said roller on the shaft or rod to adjust the same near the center or near the periphery of the said disks to alter the speed of rotation of the said rod, and consequently of the drum, all of said parts being constructed and arranged substantially as and for the purpose set forth.

In testimony that we claim the foregoing as our own we have hereto affixed our signatures in presence of witnesses.

LON PECK HELPHINSTINE.
WILLIAM AIKMAN HELPHINSTINE.

Witnesses:
ROLAND M. SMILEY,
J. W. SMILEY,
JOHN M. SMITH.